July 10, 1956   I. E. McWETHY   2,753,731
POWER TRANSMISSION MECHANISM
Filed Jan. 15, 1953

INVENTOR.
Irvin E. McWethy
BY
J. D. Douglas
His Atty.

United States Patent Office 2,753,731
Patented July 10, 1956

2,753,731
POWER TRANSMISSION MECHANISM

Irvin E. McWethy, Galesburg, Ill., assignor to Admiral Corporation, Chicago, Ill., a corporation of Delaware Application January 15, 1953, Serial No. 331,433

2 Claims. (Cl. 74—443)

This invention relates to power transmission mechanism, and particularly to gears as a medium for communicating motion from a driven member to a drivable member. More especially, the invention relates to a pair of gears in internal driving association with each other, one of the gears being of rigid structure and the other gear having a portion, for engagement with the solid gear, which is flexible.

In the manufacture of household appliances, the use of gears, cut from gear blanks, is costly. To obviate this excessive cost, gears of die-cast metal are frequently provided, but such gears, owing to their structure, are subject to excessive wear and are noisy in operation.

By the present invention, excessive wear is avoided, gear noise is eliminated and manufacturing costs are reduced.

Briefly, the invention comprehends a pair of gears in mesh with each other, one of the gears being structurally rigid and the other having a rigid back portion and a yieldable driving portion capable of being deformed within its limit of elasticity by pressure of the rigid gear acting in the direction of the back portion to increase the area of cooperation between the two gears, and to avoid noise of operation.

For an explanation, in detail, of a specific example of the invention, reference will be made to the accompanying drawing wherein.

Figure 1:
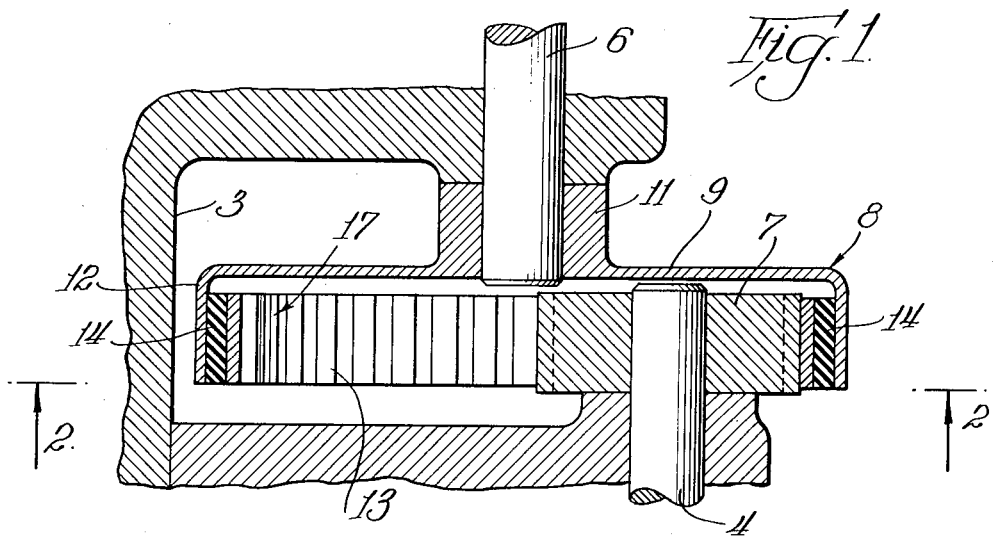
Fig. 1 is a fragmentary section on line 1—1 of Fig. 2.
Figure 2:
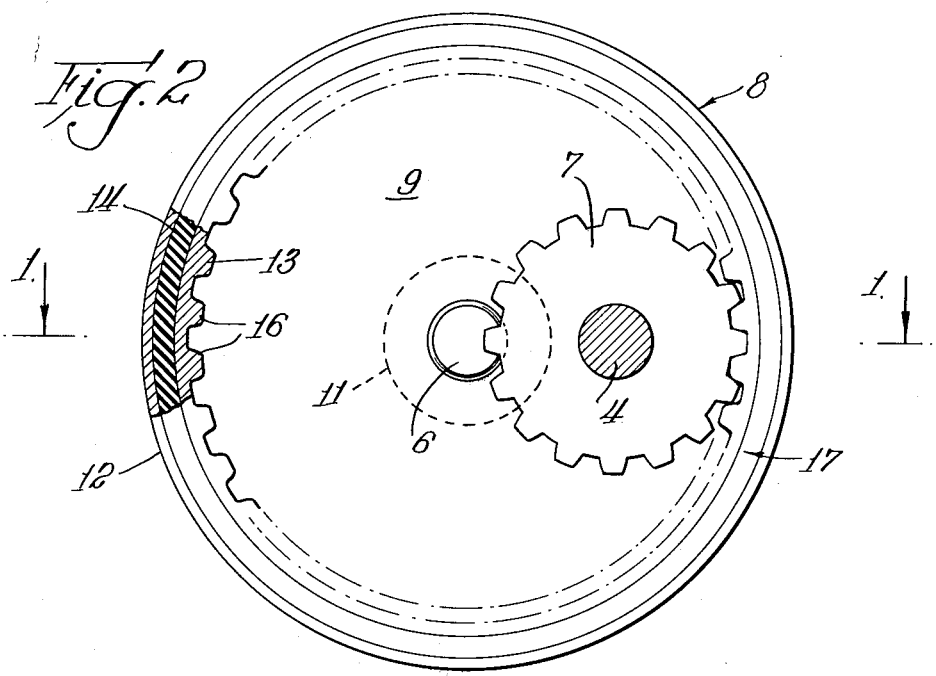
Fig. 2 is a section on line 2—2 of Fig. 1, some of the structure being omitted.

In the drawings, the reference character 3 is used to denote a frame or housing of any machine in which bearing support is provided for a pair of shafts 4 and 6, the first of which is driven by means not shown and carries at one of its ends a pinion 7 of the spur gear class. The axes of the shafts 4 and 6 are spaced apart adequately for cooperation between the pinion 7 and a composite interval gear 8 carried by the shaft 6.

Construction of the gear 8 includes a disc or web portion 9 at the center of which is a hub 11 in which the shaft 6 is received and to which the hub is rigidly secured. At its periphery, the disc 9 is formed with an annular flange or drum 12 from the inner wall of which is supported an annular toothed member 13 by a cushioning ring 14.

Since the invention aims to provide a pair of gears that are noiseless during cooperation with each other and which are also inexpensive, the pinion 7 is of rigid structure and so may be of diecast metal or of some suitable molded plastic material such as "Bakelite." The toothed member 13, on the other hand, is substantially flexible and may appropriately take the form of an endless belt such as used for belt-coupling two pulleys together, the belt having a series of teeth 16 internally thereof. A belt of this class which is well adapted to the use indicated, is one known to the trade as a Gilmer belt. The respective teeth of the gear 7 and the member 8 should, of course, be of formation complementary to each other. But inasmuch as the pinion 7 is of either diecast or molded construction, it is subject to inaccuracies in external formation due to the dies in which it is cast or to improper cooling after removal from the dies. To compensate for these irregularities, the peripheral extremities of the teeth of pinion 7 engage with normal clearance or may even exert pressure on the bottoms of the recesses between the teeth 13 thereby deflecting the belt against resistance of the cushioning ring 14, and actually increasing the area of contact of the belt teeth with the gear.

The ring 14 may be any suitable plastic or thermoplastic material capable of deformation within its elastic limits by the pressure of the pinion 7 on the belt 13. Sponge rubber or rubber compound is a satisfactory medium for the cushioning ring 14. And it is advisably fixed to both the flange 12 and the belt 13. This may be effected in any convenient manner such as by a suitable adhesive, or the interior of the drum may be brassplated prior to assembly with the belt and ring 14 and the three parts vulcanized in assembly with each other to bond them to each other throughout their peripheral regions thereby to provide a yieldable composite annular gear 17 having a rigid backing.

When in operation, the composite gear may be squeezed slightly between its backing and the pinion 7. As a result, the pinion is embraced by the gear 17 to an extent greater than would be the condition if the pinion were in mesh with a solid annular gear.

While I have shown my invention in an embodiment thereof, I am aware that extensive other departures may be made therefrom without departing from the spirit or scope of the invention.

I claim:

1. A means for coupling a driving shaft to a driven shaft comprising a rigid toothed member disposed on one shaft, the other shaft being provided with a drum having a radially extending face terminating in an annular ring being substantially perpendicular thereto, a displaceable material secured to said annular ring, a liner secured to the displaceable material and formed with teeth for meshing engagement with said toothed member, said liner and teeth being formed of soft resilient material and which is deformable upon meshing engagement with said rigid toothed member.

2. An internal gear means for coupling a driving shaft to a driven shaft comprising a rigid toothed spur gear member disposed on one shaft, the other shaft being provided with a hollow drum having a radially extending face terminating in an annular ring being substantially perpendicular thereto, a layer of displaceable material secured to the inner surface of said annular ring, a liner secured to the displaceable material and formed with teeth for meshing engagement with said gear, said liner and teeth being formed of soft displaceable resilient material arranged to be deformable by engagement with said rigid toothed member to increase its meeting engagement with said rigid toothed member.

References Cited in the file of this patent

UNITED STATES PATENTS

| 284,290 | Gilliland | Sept. 4, 1883 |
| 1,043,012 | Hudson | Oct. 29, 1912 |
| 2,060,565 | Geyer | Nov. 10, 1936 |
| 2,084,080 | D'Aubarede | June 15, 1932 |
| 2,272,900 | Saurer | Feb. 10, 1942 |
| 2,528,148 | Johnston | Oct. 31, 1950 |
| 2,605,645 | Tharpe et al. | Aug. 5, 1952 |